(No Model.) 6 Sheets—Sheet 1.

W. BOWKER & R. WILLIAMS.
LOOM.

No. 375,335. Patented Dec. 27, 1887.

Witnesses.
S. N. Piper.
R. B. Torrey.

Inventors.
William Bowker.
Robert Williams.
by R. H. Eddy atty.

(No Model.) 6 Sheets—Sheet 2.

W. BOWKER & R. WILLIAMS.
LOOM.

No. 375,335. Patented Dec. 27, 1887.

Witnesses.
S. N. Piper,
R. B. Torrey

Inventors,
William Bowker.
Robert Williams.
by R. H. Eddy att'y.

(No Model.) 6 Sheets—Sheet 3.
W. BOWKER & R. WILLIAMS.
LOOM.
No. 375,335. Patented Dec. 27, 1887.
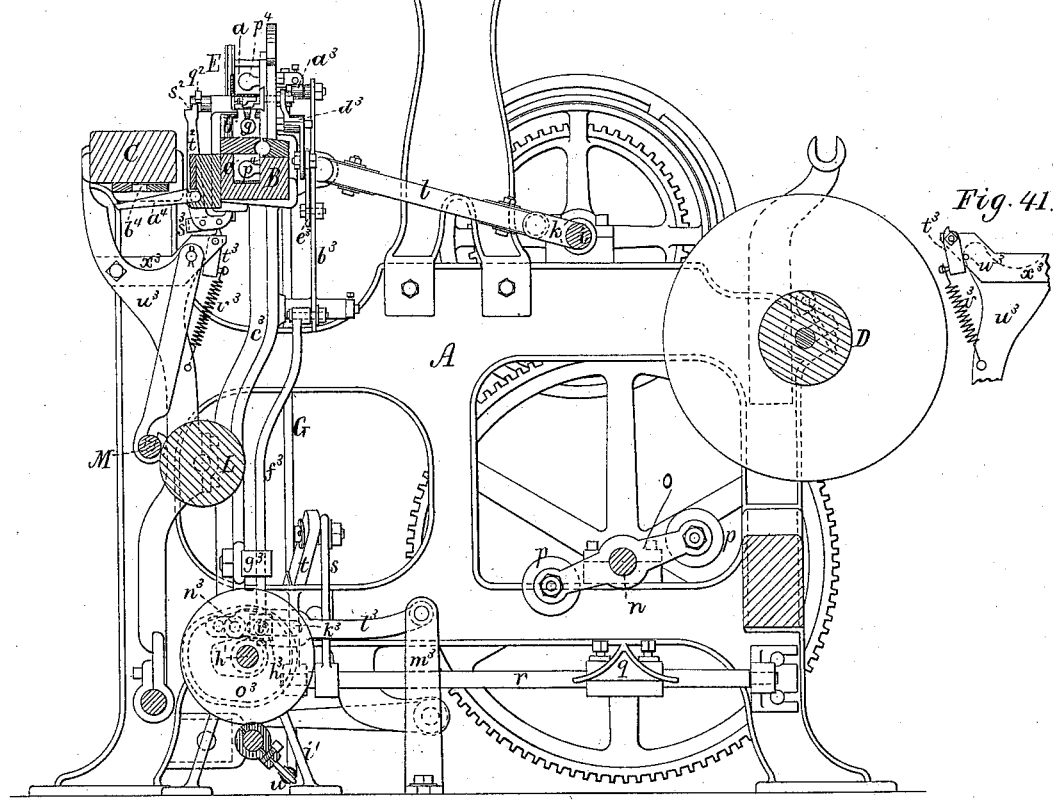
*Fig. 4.*
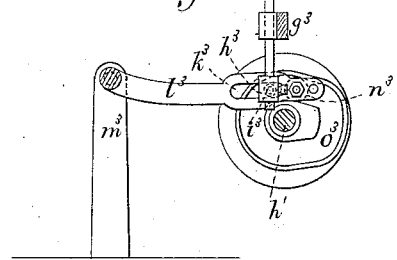
*Fig. 40.*
*Fig. 41.*
Witnesses.
S. N. Piper.
R. B. Torrey.
Inventors.
William Bowker.
Robert Williams.
by R. H. Eddy atty.

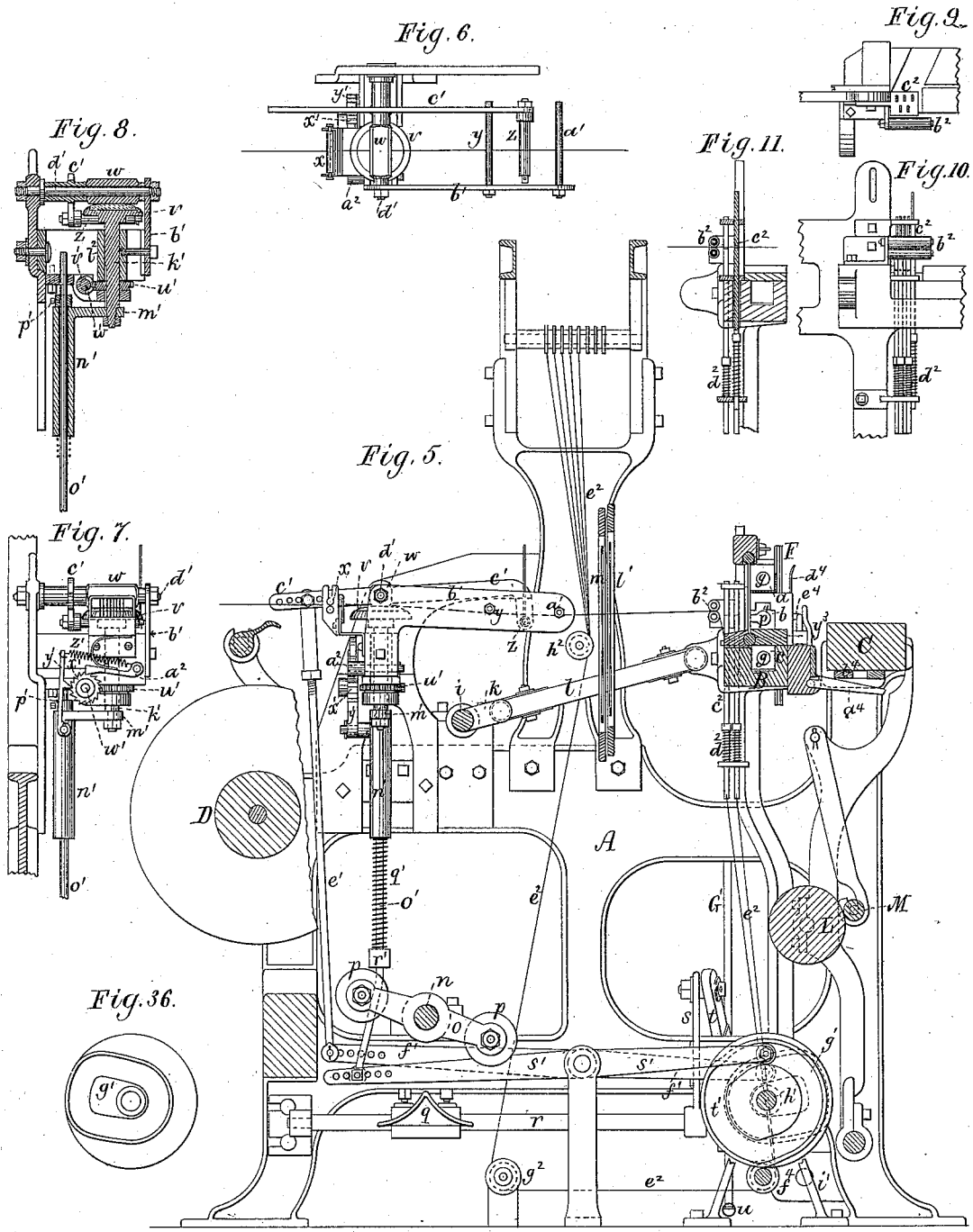

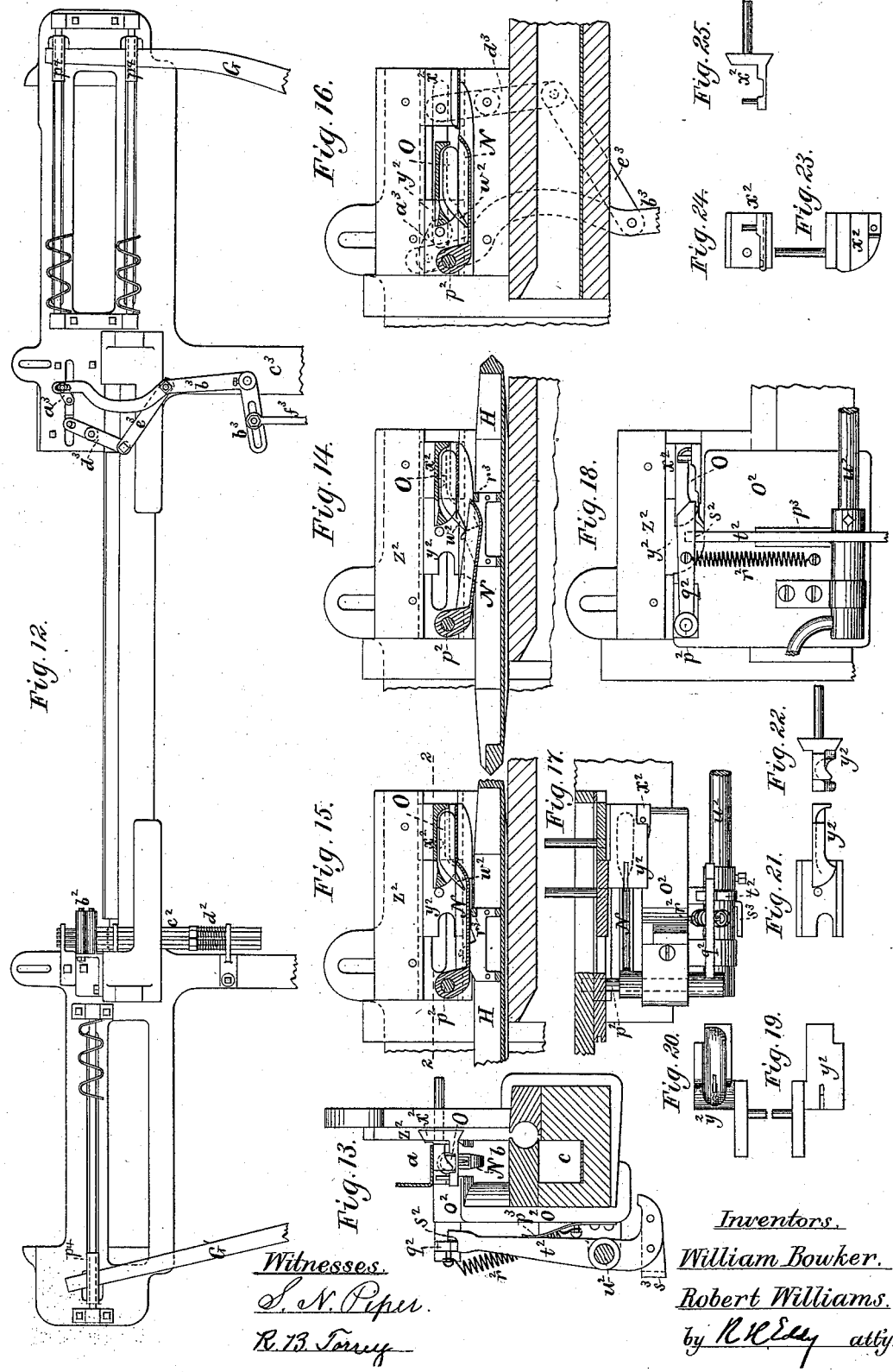

(No Model.) 6 Sheets—Sheet 6.

W. BOWKER & R. WILLIAMS.
LOOM.

No. 375,335. Patented Dec. 27, 1887.

Witnesses.
S. N. Piper
R. J. Torrey

Inventors.
William Bowker
Robert Williams
by R. H. Eddy att'y.

UNITED STATES PATENT OFFICE.

WILLIAM BOWKER, OF WEST MEDFORD, AND ROBERT WILLIAMS, OF BOSTON, MASSACHUSETTS.

LOOM.

SPECIFICATION forming part of Letters Patent No. 375,335, dated December 27, 1887.

Application filed February 19, 1887. Serial No. 228,253. (No model.)

*To all whom it may concern:*

Be it known that we, WILLIAM BOWKER, of West Medford, in the county of Middlesex, and ROBERT WILLIAMS, of Boston, in the county of Suffolk, of the Commonwealth of Massachusetts, have invented a new and useful Improvement in Looms; and we do hereby declare the same to be described in the following specification, and represented in the accompanying drawings, of which—

Figure 1:
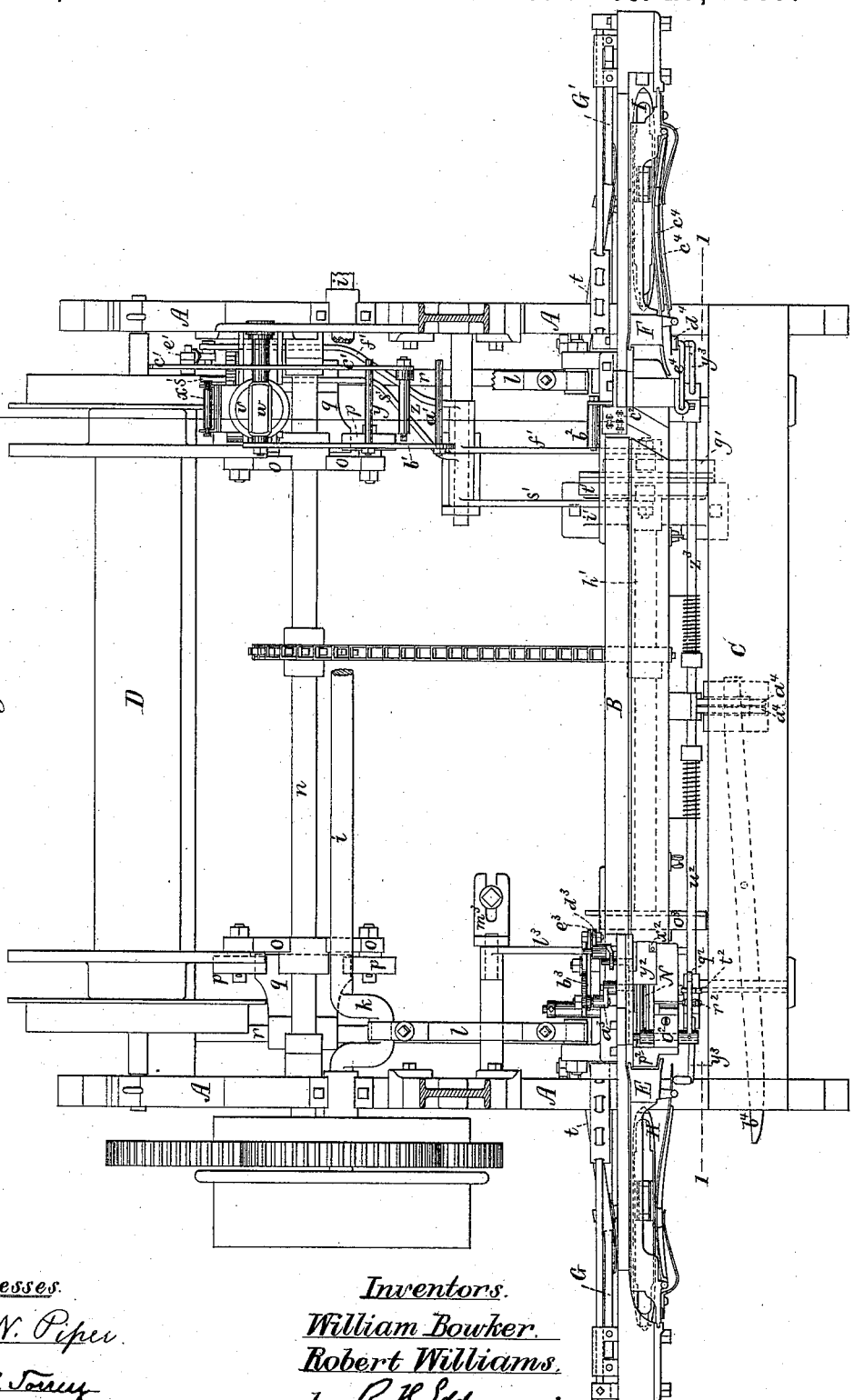
Figure 2:
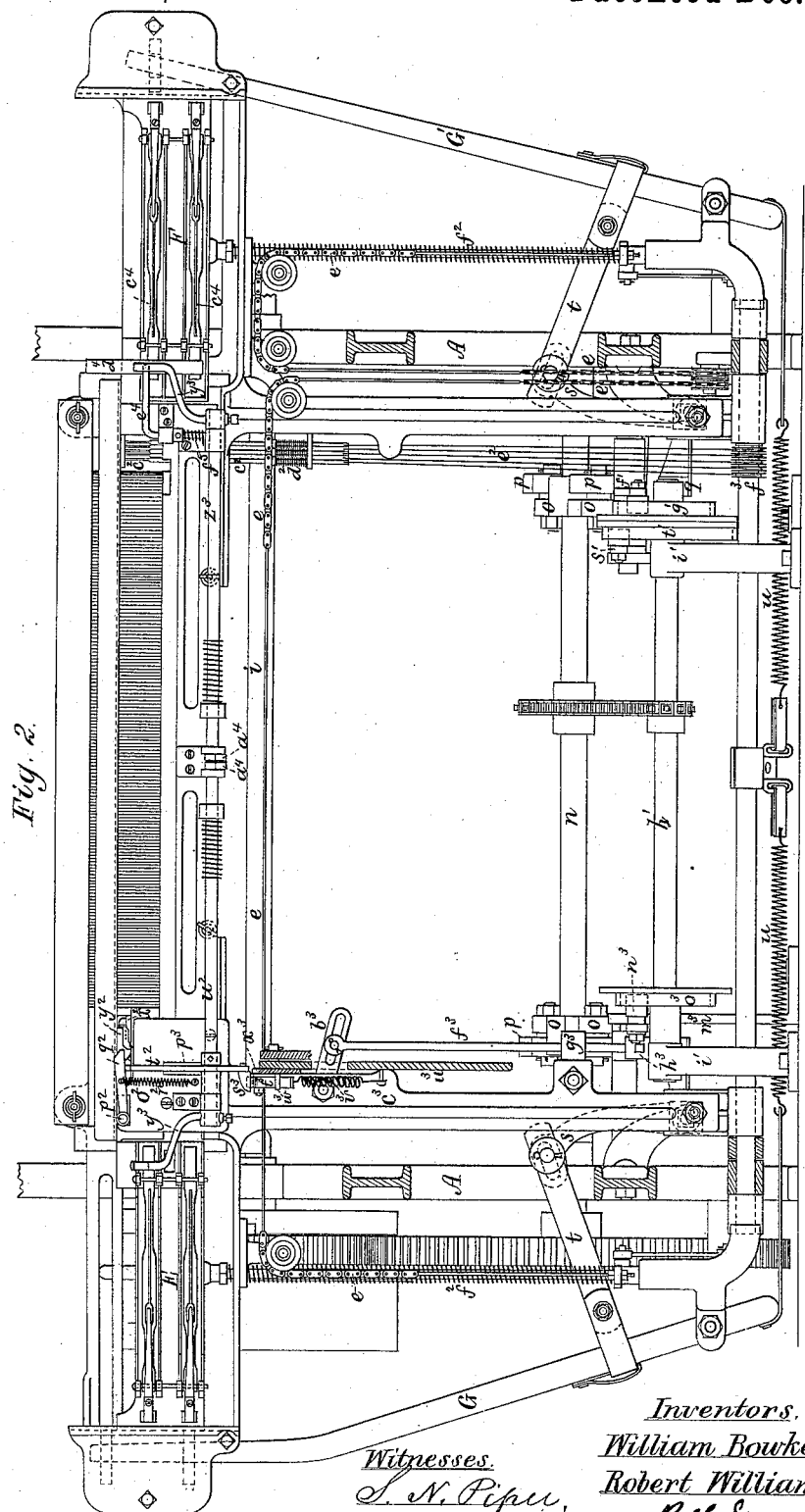
Figure 3:
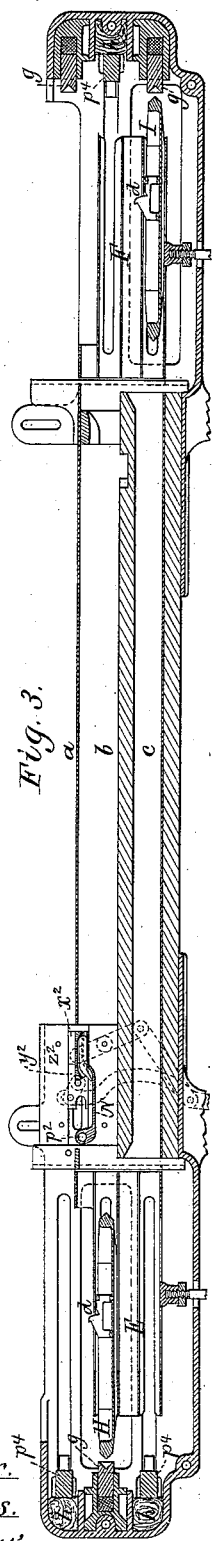
Figure 26:
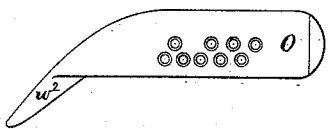
Figure 27:
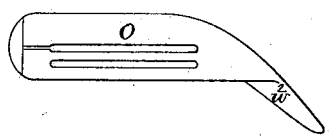
Figure 28:
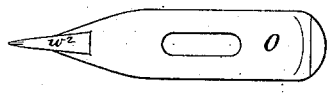
Figures 29, 30:
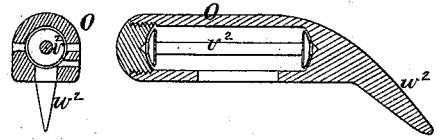
Figure 31:
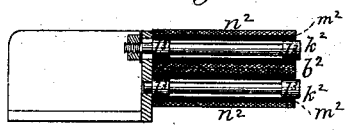
Figure 37:
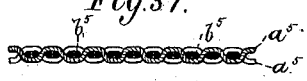

Figure 1 is a top view of the loom, and Fig. 2 is a sectional elevation of it, as taken on line 1 1 of Fig. 1, just in front of the lay. Fig. 3 is a vertical longitudinal section of the race-beam of the lay, such section exhibiting the three races and the two shuttles, to be described. Figs. 4 and 5 are transverse and median sections of the loom, one showing the parts to the right and the other those to the left of the plane of section. Fig. 6 is a top view, Fig. 7 an end elevation, and Fig. 8 a transverse section, of the weft-thread tension mechanism. Fig. 9 is a top view, Fig. 10 a rear elevation, and Fig. 11 a transverse section, of the weft-thread auxiliary tension mechanism. Fig. 12 is a rear view of the race-beam of the lay. Fig. 13 is a transverse section, on an enlarged scale, of the said race-beam. Figs. 14, 15, and 16 are views of one of the primary or weft shuttles, the selvage-thread shuttle, and the mechanism for removing the weft from the primary shuttle and elevating it into a position for the selvage-thread shuttle to pass through it, (the said weft.) The first of these figures represents the weft-thread transferrer in its lower position, while in Fig. 15 it is shown in its higher or level position, with the nose of the selvage-shuttle within it, (the said transferrer,) ready for the shuttle to be driven through the looped weft. Fig. 16 shows the position of the transferrer and the selvage-shuttle after the latter has been driven through the looped weft. Fig. 17 is a horizontal section on line 2 2 of Fig. 15. Fig. 18 is a front view of the mechanism for holding the said transferrer in either of its positions. Fig. 19 is a top view, Fig. 20 a bottom view, Fig. 21 a side elevation, and Fig. 22 an end view, of the carrier of the selvage-shuttle. Fig. 23 is a top view, Fig. 24 a side elevation, and Fig. 25 an end elevation or view, of the selvage-shuttle supporter. Figs. 26 and 27 are opposite side views, Fig. 28 a bottom view, Fig. 29 a longitudinal and median section, and Fig. 30 a transverse section, of the selvage-shuttle, such figures being on an enlarged scale. Fig. 31 is a longitudinal section, and Fig. 32 a transverse section, on an enlarged scale, of the fingers $b^2$, which may be termed the "auxiliary tension mechanism of the weft-thread." Fig. 33 is a top view, Fig. 34 a longitudinal median section, and Fig. 35 a transverse section, on an enlarged scale, of one of the primary or weft shuttles. Fig. 36 is a face elevation of the grooved cam $g'$. Fig. 37 is a longitudinal section, Fig. 38 a transverse section, and Fig. 39 a selvage-edge view, on an enlarged scale, of a piece of cloth as made by the loom. Fig. 40 is a view of the cam and certain parts adjacent thereto of the mechanism for operating the selvage-thread-shuttle carrier and its supporter. Fig 41 is an inner side view of the tripper $t^3$, its support $x^3$, and stop or stud $w^3$, as hereinafter explained.

In the several figures like letters indicate like parts of the mechanism, as hereinafter described.

The improvement is to enable the loom to weave cloth with two layers or ranges of weft in each decussation of the warps, and to do this without the weft being wound upon a bobbin carried by a shuttle, as in ordinary looms for weaving the weft.

In weaving some kinds of cloth it becomes very inconvenient to have the filling or weft carried on a bobbin or spool within the shuttle, particularly when the filling or weft is coarse, and in consequence thereof but a small length of it can be used within a shuttle in comparison with what can be employed in weaving with much finer yarn. With my improvement a coarse filling can be used in weaving, it being taken from a large bobbin or spool disconnected from the shuttle and of a size to carry a very much greater quantity of filling than can be introduced into the shuttle.

In the operation of this loom the weft-thread in a doubled state is carried by the shuttle through the opening or shed of the warp, after which a selvage-thread separate from the weft-thread is by a small shuttle caused to pass through the doubled weft. The race-beam of the lay, as hereinafter shown, has three races for the two weft-shuttles to move through, and, besides, there are to operate with such races and shuttles two sets of drop-boxes, of which there are two boxes to each set, one being arranged directly over the other. Let us now suppose one of the weft-shuttles to be in the upper box of one set and the other in the lower box of the other set, as such will always be their condition preparatory to their movements from one set to the other. Let us further suppose the three races of the lay to be arranged so that the upper one is directly over the middle one and the latter directly over the lower one, as they are in practice, and the upper box of one set of the drop-boxes to have in it a shuttle and to be in range with the middle race, and the lower box of the other set of drop-boxes to have in it a shuttle and to be in range with the lowest race, as thus the loom will be ready for operation. The two weft-shuttles are next to be simultaneously thrown through the middle and lowest races, one shuttle going in the opposite direction to that of the other. The shuttle that was sent through the middle race has carried with it the weft in a doubled state; but the shuttle that has been driven through the lowest race has not carried with it any weft, but has been thrown into the drop-box to be next carried into range with the middle race and used in carrying forward at the proper time another doubling of the weft-thread, which it will do while the other shuttle is passing through its return-race, both the drop-boxes having been simultaneously moved to admit of the last-named movements of the shuttles. While one shuttle is ejected from one toward and into the other of the drop-boxes, the other shuttle is likewise thrown in the opposite direction from one drop-box to the other. The drop-boxes are moved intermittingly, first upward, and after remaining at rest a sufficient time are next moved downward, and remain down at rest for an equal period. The weft-thread is carried only through the middle race, the other races being for the return movements of the two shuttles.

After a shuttle has drawn the weft through the middle race, such shuttle at the proper time will be returned through one of the other races—that is, either through the uppermost or the lowermost of such races. The shuttle that is projected from the upper chamber of the right drop-box will be received in the upper chamber of the left drop-box, after which both drop-boxes will be raised sufficiently to allow of the shuttle being driven back over the upper race. The other shuttle during the return-flight of the first one will have been driven through the middle race, and after the drop-boxes have been moved downward will be returned through the lowest race. Thus it will be seen that one shuttle goes through the middle race and thence back through the uppermost race, the other shuttle in the meantime going through the middle race and back through the lowermost race. Preparatory, however, to each return movement of one of the weft-shuttles, the selvage-thread is introduced through the loop of the weft-thread, such weft-thread being subsequently drawn with proper tension upon such selvage-thread, and by the reed of the lay beaten up into the decussation of the warps.

Figure 38:
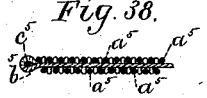
Figure 39:
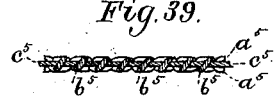

In Figs. 37, 38, and 39 the warp-threads are shown at $a^5$, the weft at $b^5$, and the selvage-thread at $c^5$.

In the drawings the loom-frame is shown at A, the lay at B, the breast-beam at C, and the warp-beam at D, the three raceways or races of the lay being represented at $a$, $b$, and $c$. The two drop-boxes are shown at E and F, each having in it two chambers or receptacles for the shuttles. Each drop-box is applied in the usual way to the lay, so as to be movable upward and downward rectilinearly therein. To the lay there are two picker-staves, G and G', one, G, to operate with the left drop-box, and the other, G', with the right drop-box. The right staff operates one and the left two pickers, $p^4$.

Figure 34:
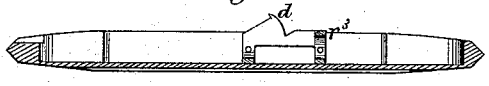
Figure 35:

The two weft-shuttles are shown in Fig. 3 at H and I, the first one being in the upper chamber of the left drop-box and the other being in the lower chamber of the right drop-box. Each shuttle carries a pair of parallel hooks or fingers, $d$, which are arranged and formed as shown in Figs. 34 and 35, with a space between them. Besides there is extended across each shuttle a bridge, as hereinafter described.

For operating the drop-boxes the most, if not any, of the regular mechanisms for drop-box looms may be used, that employed in the well-known "Knowle's Drop-Box Loom," shown in United States Patent No. 134,992, January 21, 1873, serving well the purpose, parts of this mechanism, with the exception of what is termed the "dobby" thereof, being shown in the drawings. The said mechanism, as well as its mode of operation, being well understood by loom-makers and persons skilled in the art of weaving cloth by drop-box looms, need not be fully described.

In Fig. 2 the chains for operating or raising the drop-boxes by the dobby are shown at $e$, such boxes descending by their own weight and being provided with springs $f^2$, as usual, to ease their descent. The lay is provided with the usual bunters for the shuttles and picker-staves, such being shown at $g g g$ and at $h h h$ in Fig. 3. The lay, like that of other drop-box looms, is provided with mechanism for moving it back and forth; it being such as is in common use for the purpose, its driving and crank shaft being shown at $i$, one of its cranks at $k$, and the connecting-rod thereof at $l$ in Fig. 5.

The loom harnesses or heddles (represented at $l'$ and $m$ in Fig. 5, but omitted for the sake of clearness from the other views) are like those used in other drop-box looms, and when the loom is weaving cloth they are operated by the mechanism usually employed for giving to them their necessary vertical motions. As they constitute elementary parts of an ordinary drop-box loom, they and their operative mechanism need not be herein explained.

For operating each of the picker-staves the usual mechanism for such purpose is employed; but both are moved simultaneously inward as well as outward, as both shuttles are at one and the same time in flight in opposite directions. To a horizontal shaft, $n$, at each end of the loom-frame (see Fig. 5) there are two arms, $o$, carrying friction-rollers $p$, such rollers, while the shaft is in revolution, being alternately carried against a cam, $q$, projected from a rock-shaft, $r$, provided with an arm, $s$, which at its upper end is connected with the picker-staff by a strap or connection, $t$. (See Figs. 2 and 5.) At suitable times while the shaft $n$ is being revolved both picker-staffs will be put in action or moved simultaneously inward, they being retracted by springs $u$, connected with them at their heels and arranged as shown in Fig. 2.

The weft wound on a spool, K, suitably supported so as to be free to revolve or not, as occasion may require, is led from thence between a pair of guide-rollers, $x$, and thence between a presser, $v$, and a rocker-plate, $w$. (See Figs. 1, 6, 7, and 8.) Thence it goes under two rods, $y$ and $a'$, and over an intermediate one, $z$, arranged as shown in Figs. 1 and 6. The two rods $y$ and $a'$ project from a stationary bar, $b'$, while the rod $z$ is extended from a lever, $c'$, having its fulcrum at $d'$. (See Fig. 5.) The rear or lower arm of the said lever has a connecting-rod, $e'$, extending from it to one arm of a lever, $f'$. (See Fig. 5.) The opposite arm of the said lever $f'$ carries a friction-roller to enter a grooved cam. (Shown in dotted lines in Fig. 5 at $g'$ and in side elevation in Fig. 36.) This cam is fixed on a horizontal shaft, $h'$, (see Figs. 2, 4, and 5,) supported in standards $i'$. The shank $k'$ (see Figs. 7 and 8) of the presser $v$ is arranged in a vertical guide, $l^2$, and at its foot is attached by an arm, $m'$, to a tube, $n'$, up through which a rod, $o'$, passes, there being on and fixed to such rod at its upper part a collar, $p'$, that bears on the top of the said tube $n'$. There encompasses the rod $o'$ a spiral spring, $q'$, (see Fig. 5,) which at its foot rests on a step, $r'$, fixed to the rod. At its lower end the said rod is pivoted to one arm of a lever, $s'$, from whose other arm a stud or friction-roller extends into the groove of a cam, $t'$, carried by the shaft $h'$. When the cam causes the lever to force the rod $o'$ upward, the spring $q'$ will cause the presser $v$ to be forced upward, so as to clamp the weft between such presser and the rocker-plate $w$ with sufficient force to cause the necessary tension to be produced on the weft for the slack of it to be taken up by the action of the rod $z$, which at that time is forced upward between the rods $y$ and $a'$ (see Fig. 6) and presses upward the weft that extends from one to the other of such rods $y$ and $a'$. On the rod $o'$ being pulled downward the presser will be drawn away from the rocker-plate $w$, so as to allow the weft to be freely drawn off the spool by the shuttle during its flight over its races.

The weft by the shuttle has to be carried beyond the selvage edge of the cloth, in order for the selvage-thread to be by its shuttle passed through the loop or slack part of the weft. This slack of the weft has to be taken up before the lay beats up, the taking up of the slack, so as to cause the weft to lie as straight as possible in the decussation of the warps, being effected by the action of the slack-take-up rod $z$, as before described.

In order that the presser may not be worn unevenly or in one place by the weft in passing across it, such presser has mechanism for intermittingly revolving it. This mechanism may be thus described: A worm-gear, $u'$, (see Figs. 7 and 8,) fixed on the shank of the presser, engages with a screw or worm, $v'$, secured on a shaft, $w'$, provided with a ratchet-wheel, $x'$, with which an impelling-pawl, $y'$, pivoted to the tube $n'$, engages, and is kept up to the wheel by a spring, $z'$. A retaining-pawl, $a^2$, pivoted to the frame, engages, as shown in Fig. 7, with the ratchet-wheel. During each descent of the tube $n'$ and the presser the latter will be partially revolved by the action of the impelling-pawl, the ratchet-wheel, and the worm and worm-gear, as described, and thus a fresh surface of the presser will be brought around from time to time directly under the rocker-plate $w$. Thus uneven wear of the presser by the weft is prevented. After passing between the presser and the rocker-plate the weft is led between two guide-fingers, (shown at $b^2$ in Fig. 5,) and thence through one of a set of jacks, $c^2$. (See Figs. 5, 9, 10, and 11.) The said jacks are arranged as shown in top view in Fig. 9, one of them in Fig. 10 being represented as extending somewhat above the others. Each is supported so as to be movable vertically, and is provided with a spiral spring, $d^2$, for forcing it upward. Cords $e^2$, attached to the lower ends of the jacks, pass around guide-pulleys $f^4$, $g^2$, and $h^2$, (see Figs. 2 and 5,) and thence to the jacks of the dobby.

The jacks operated by the dobbies, as occasion may require, are to enable a series of weft-threads of different colors to be used successively, as may be desirable in weaving cloth striped transversely, each weft-thread being on a separate spool and being led therefrom between the presser and the rocker plate, and thence under the rod $y$, thence over the rod $z$, thence under the rod $a'$, (see Figs. 5 and 6,) thence to the bite of the fingers $b^2$, and thence through a jack, $c^2$, and to the cloth at one selvage thereof, the said cloth continuing over the breast-beam C, and thence down to and partly about the cloth-take-up beam L, and thence to the cloth-roller M. Mechanism for taking up the cloth as fast as it may be woven need not be further described or represented, as it forms no part of our invention, and can be such as ordinarily employed for such purpose in other looms.

Figure 32:
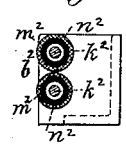
Figure 33:
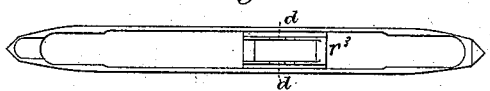

The pair $b^2$ of fingers between which the weft passes, as hereinbefore described, is shown in Figs. 31 and 32, each being composed of a metallic core, $k^2$, which is reduced in diameter between its end portions, $l^2$, and is encompassed by an india-rubber tube, $m^2$, and the latter by a sleeve, $n^2$, of felt, the rubber tube being fastened to the parts $l^2$. From this it will be seen that the surface of each of these fingers is more or less yielding or elastic, and in practice will operate to allow a knot or enlargement of the weft-thread to pass between them without danger of breakage of the weft. These fingers, while the lay beats back, are also to keep suitably extended for the shuttle to catch upon it that part of the weft which is between the fingers and the cloth.

As heretofore stated, the two shuttles are thrown simultaneously in opposite directions across the lay. One of such shuttles in its flight catches by its two hooks, $d\ d$, the weft-thread and draws it off its spool and loops it through the decussation of the warps. The loop of the weft is carried to a suitable distance beyond the cloth or warps for the next operation. Toward the latter part of its flight the shuttle carrying the weft-thread in a looped condition passes under the transferrer N, (see Fig. 14,) the shuttle being shown in said figure and also in Fig. 15 at H. This transferrer is an arm slotted lengthwise and projecting from a shaft, $p^2$, pivoted within a frame, $o^2$, fixed upon the race-beam of the lay. From the said shaft another arm, $q^2$, is extended, as shown in Fig. 17. A spring, $r^2$, attached to the arm $q^2$ and to the frame $o^2$, serves to depress the transferrer N. When the transferrer is in its lower position, the arm $q^2$ rests in a notch, $s^2$, in the top of a lever, $t^2$, (see Figs. 13 and 18,) such lever being fulcrumed on a shaft, $u^2$, arranged as represented. As the shuttle passes along under the transferrer, the latter, by a bridge, $r^3$, extending across the shuttle, will be forced upward into a horizontal position, as shown in Figs. 3, 15, and 16, and the loop of the weft on the hooks of the shuttle will be caught by and laid upon the transferrer and drawn off the said hooks as the shuttle may advance. On the transferrer attaining a horizontal position it will be held therein by the lever $t^2$, which, by a spring, $p^3$, will be moved underneath the arm $q^2$. Next the lay beats up and the selvage-shuttle is moved by its carrier $y^2$ off the transferrer and upon the shuttle-supporter $x^2$, the said carrier and supporter moving at the same time toward each other, as hereinafter described. As soon as the selvage-shuttle passes off the transferrer the latter is depressed by the spring $r^2$, the lever $t^2$ having been moved from underneath the arm $q^2$. The mechanism for so moving the said lever $t^2$ is as follows: From the lower arm of the lever $t^2$ there projects an ear, $s^3$. (See Figs. 2, 4, and 13.) Below said lower arm is a tripper, $t^3$, which is a short lever fulcrumed to a plate, $x^3$, fixed to one of the supports $u^3$ of the roller L. A spring, $v^3$, is connected to the lower arm of the tripper and to the support $u^3$. In an advance of the lay the tripper at its upper part will be struck and passed by the ear $s^3$, the spring allowing the tripper to give way at the time; but on retreat of the lay the ear will be carried against the tripper, which, by its lower arm resting against a stop or stud, $w^3$, (see Fig. 41,) extending from the plate $x^3$, will be held stationary, and thereby will cause the lever $t^2$ to be moved from underneath the arm $q^2$, which, by the spring $r^2$, will be depressed into the notch $s^2$ of said lever $t^2$. Above the transferrer is a small shuttle, O, which carries a spool, $v^2$, on which is wound the selvage-thread. This shuttle, therefore, may be termed the "selvage-thread shuttle," its purpose being to carry a selvage-thread through the loop of the weft. The nose $w^2$ of the shuttle O projects within the transferrer a little when the latter is down in its lower position, the shuttle being so loose in its race as to give way or rise up a little while the weft-thread is passing upon the transferrer and under and against the said nose. On the transferrer being elevated to its higher position the nose will extend, as shown in Fig. 15, farther into it, (the said transferrer.) Next the selvage-thread shuttle is driven forward upon the transferrer and through the loop of weft. The mechanism for operating the said selvage-thread shuttle is thus explained:

The shuttle-supporter is shown at $x^2$ and the shuttle-carrier at $y^2$, both being movable rectilinearly and properly supported therefor in the vertical part $z^2$ of the lay. A short link, $a^3$, connects the shuttle-carrier with a lever, $b^3$, fulcrumed to the sword $c^3$ of the lay. (See Figs. 1, 4, 12, and 16.) The shuttle-supporter $x^2$ is pivoted to a lever, $d^3$, connected by a link, $e^3$, to the lever $b^3$, all being as represented. The lower arm of the lever $b^3$ is jointed to a rod, $f^3$. (See Figs. 2, 4, and 12.) This rod extends loosely through a bearing, $g^3$, projecting from the sword of the lay, as shown in Figs. 2 and 4. Furthermore, the rod at its lower end has fixed to it a short cylindrical sleeve, $h^3$, from which a stud or friction-roller, $i^3$, extends into a straight slot, $k^3$, in an arm, $l^3$, pivoted to a stationary standard, $m^3$. (See Figs. 2 and 4.) The said arm has a stud or friction-roller, $n^3$, (see Fig. 40,) extending from it into the groove of a cam, $o^3$, carried by the shaft $h'$. (See Figs. 2 and 4.) In the revolution of this cam the shuttle-carrier will be advanced, and the shuttle-supporter will be moved in an opposite direction simultaneously, in order not only to impel or drive the shuttle forward through the loop of weft, but to move the supporter, so as to have a clear space for the weft-thread to be released from the shuttle, which having taken place, the weft-thread is drawn by its take-up mechanism, hereinbefore described, closely upon the selvage-thread, and the lay beats up in order to drive up the doubled layer of weft.

Instead of one stop-motion shaft carrying the two arms $y^3$, as in ordinary looms having drop-shuttle boxes, we have two shafts, $u^2$ and $z^3$, (see Figs. 1 and 2,) they being arranged horizontally in line with each other and pivoted to the lay. Each of said shafts at its inner end has an arm, $a^4$, extending from it, these arms being to actuate the lever $b^4$. (Shown in Fig. 1 by dotted lines, and in section in Figs. 4 and 5.) This lever is part of the ordinary "stop-motion" for arresting the loom in case a shuttle in its flight does not properly enter the box toward which it may be driven. The construction and function of this lever are fully set forth in United States Patent No. 6,986, January 1, 1850, and need not be detailed here. Furthermore, we place between the right arm $y^3$ and the two shuttle-binders $c^4$ a vertical bar, $d^4$, fastened at its middle to an arm, $e^4$, (see Figs. 1 and 2,) pivoted to the lay, and having a spring, $f^5$, to cause it to bear against the binders. The said additions or bar $d^4$, arm $e^4$, and spring $f^5$ are to insure the arm $y^3$ being moved by either right shuttle-binder, whatever may be its position when a shuttle passes into the compartment to which such binder belongs.

We claim—

1. The combination, with the loom-lay provided with three races, as described, of the two shuttles having hooks and mechanism for operating them, (the said shuttles,) as explained, the two sets of drop-boxes having mechanism for operating them, as set forth, and the selvage-thread shuttle having mechanism for operating it, as specified, to cause it to lay through the series of loops of the weft, at one edge of the fabric woven, a binding-thread separate from the weft, all being substantially as represented.

2. The combination of the loom-lay having three races and mechanism for operating it, as described, two shuttles having hooks and mechanism for driving them, (the said shuttles,) as explained, two sets of drop-boxes having mechanism for operating them, as set forth, and the selvage-thread shuttle having mechanism for operating it, as specified, to cause it to lay through the series of loops of the weft, at one edge of the fabric, a binding-thread separate from the weft, with the weft-thread take-up mechanism essentially and to operate as represented, such take-up mechanism consisting of the rods $y$ and $a'$, their support-bar $b'$, the rod $z$, lever $c'$, connecting-rod $e'$, lever $f'$, grooved cam $g$, and the shaft $h'$, all being arranged and to operate substantially as set forth.

3. The combination of the loom-lay having three races and mechanism for operating it, as described, two shuttles having hooks and mechanism for driving such shuttles, as explained, two sets of drop-boxes having mechanism for operating them, as set forth, and the selvage-thread shuttle having mechanism for operating it, as explained, to cause it to introduce through the series of loops of the weft, at one edge of the fabric, a binding-thread separate from the weft, with the weft-thread tension mechanism, substantially as described, consisting of the plate $w$ and the presser $v$ and its mechanism for pressing it up to and withdrawing it from the said plate, as stated, and consisting of the shank $k'$, arm $m'$, tube $n'$, rod $o'$, collar $p'$, spring $q'$, step $r'$, lever $s'$, and cam $t'$, all arranged and to operate as represented.

4. The combination, with the weft-thread tension mechanism, consisting of the plate $w$ and the presser $v$ and its mechanism for forcing it up to and withdrawing it from the said plate, and consisting of the shank $k'$, arm $m'$, tube $n'$, rod $o'$, collar $p'$, spring $q'$, step $r'$, lever $s'$, and cam $t'$, of the mechanism for intermittingly revolving the presser to prevent it from being worn in one place only by the weft in passing across it, such mechanism consisting of the worm-gear $u'$, worm $v'$, shaft $w'$, ratchet-wheel $x'$, impelling-pawl $y'$, spring $z'$, and retaining-pawl $a^2$, applied and arranged essentially as represented.

5. The combination of the pair of guide or auxiliary tension-fingers $b^2$, substantially as described, with the weft take-up and tension mechanisms, essentially as described, and with the loom-lay having three races and mechanism for operating it, as explained, the two shuttles having hooks and mechanisms for impelling them (the said shuttles) through the races, as set forth, two sets of drop-boxes having mechanism for operating them, as specified, and the selvage-thread shuttle having mechanism for operating it, as explained, to cause it to introduce through the series of loops of weft, at one edge of the fabric, a binding-thread separate from the weft, all being substantially as represented.

6. The combination of the set of jacks $c^2$, provided with mechanism for operating them, substantially as described, with the loom-lay having three races and mechanism for operating it, as explained, the two shuttles provided with hooks and having mechanism for operating them (the said shuttles) with respect to the said races, as set forth, two sets of drop-boxes having mechanism for operating them, as specified, and the selvage-thread shuttle having mechanism for operating it, as explained, to cause it to introduce through the series of loops of weft, at one edge of the fabric, a binding-thread separate from the weft, all being essentially as set forth.

7. The combination of the transferrer N, with the selvage-thread shuttle O and its carrier $y^2$ and supporter $x^2$, having mechanisms for operating them, essentially as set forth.

8. The combination of the lever $b^4$ and the two shafts $u^2$ and $z^3$, having arms $a^4$ $a^4$ projecting from them, as explained, with the lay having three races and mechanism for operating it, as set forth, the two shuttles having hooks and mechanism for impelling said shuttles through the said races, as explained, the binding-thread shuttle having mechanism for operating it, as described, the two sets of drop-boxes having mechanism for operating them, as explained, the arms $y^3$, extending upward from the said shafts, the vertical bar $d^4$, the arm $e^4$, and spring $f^5$, all being substantially as represented.

WILLIAM BOWKER.
ROBERT WILLIAMS.

Witnesses:
R. H. EDDY,
R. B. TORREY.